(12) United States Patent
Mitchell et al.

(10) Patent No.: US 7,835,034 B1
(45) Date of Patent: Nov. 16, 2010

(54) HALFTONE METHOD AND APPARATUS THAT PROVIDES A LINE SCREEN FREQUENCY OF N/2 FOR A PRINTER RESOLUTION OF N DOTS PER INCH WITHOUT NEGATIVE PRINT EFFECTS

(75) Inventors: Joan LaVerne Mitchell, Longmont, CO (US); Timothy James Trenary, Fort Collins, CO (US); Danielle K. Dittrich, Longmont, CO (US); Yue Qiao, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 0 days.

(21) Appl. No.: 09/571,968

(22) Filed: May 16, 2000

(51) Int. Cl.
*G06K 15/00* (2006.01)
(52) U.S. Cl. ...................... 358/3.06; 358/3.01
(58) Field of Classification Search .............. 358/1.2, 358/1.9, 2.99, 3.01, 3.06, 3.07, 533–536, 358/3.13, 463
See application file for complete search history.

(56) References Cited

U.S. PATENT DOCUMENTS

| | | | |
|---|---|---|---|
| 3,573,789 A | | 4/1971 | Sharp et al. |
| 3,742,129 A | * | 6/1973 | Roberts et al. ............... 358/534 |
| 4,752,822 A | * | 6/1988 | Kawamura ................... 358/523 |
| 4,924,301 A | * | 5/1990 | Surbrook ..................... 358/534 |
| 5,107,349 A | | 4/1992 | Ng et al. |
| 5,270,835 A | * | 12/1993 | Urabe et al. .................. 358/3.2 |
| 5,291,310 A | | 3/1994 | Levien |
| 5,382,967 A | | 1/1995 | Curry |
| 5,386,301 A | | 1/1995 | Yuasa et al. |
| 5,406,383 A | * | 4/1995 | Tanaka ......................... 358/401 |
| 5,471,543 A | | 11/1995 | Ng et al. |
| 5,489,991 A | | 2/1996 | McMurray |
| 5,543,941 A | * | 8/1996 | Parker et al. ................. 358/534 |
| 5,574,832 A | * | 11/1996 | Towery et al. ............... 358/1.9 |
| 5,587,811 A | | 12/1996 | Liguori |
| 5,602,653 A | * | 2/1997 | Curry ......................... 358/3.26 |

(Continued)

OTHER PUBLICATIONS

Theophano Mitsa and Kevin J. Parker, "Digital Halftoning Using a Blue Noise Mask", IEEE, 1991, pp. 2809-2812.*

*Primary Examiner*—James A Thompson
(74) *Attorney, Agent, or Firm*—Merchant & Gould

(57) ABSTRACT

A halftone method and apparatus provides a line screen frequency of N/2 for a printer resolution of N without negative print effects. A 300 lines per inch halftone screen for a 600 dpi printer may thus be created by alternating white and saturated colored lines when half of a given color component's pels are on. Empirical rules are used to create the screens based on how that printer creates consistent and reliable levels for each color component. These rules allow intermediate intensity values between white and full-on at each pel. Since the halftoning is done in the hardware just before printing, the print direction relative to the threshold matrix is known. No rotation capability is needed in the hardware. If an image needs to be rotated, it can be done previously to being sent to the hardware. Furthermore, because a pair of pels are turned on for the lightest values (or possibly with a one level difference between the first and second dots in the pair), the electronics are stressed less. Moreover, the drive will be at a lower frequency than the first dot in the traditional halftone cell, which remains isolated for many levels.

12 Claims, 13 Drawing Sheets

U.S. PATENT DOCUMENTS

| | | | |
|---|---|---|---|
| 5,745,249 A * | 4/1998 | Crean et al. | 358/3.06 |
| 5,748,856 A * | 5/1998 | Cariffe et al. | 358/1.2 |
| 5,751,470 A | 5/1998 | Damon | |
| 5,777,757 A * | 7/1998 | Karlsson et al. | 358/3.1 |
| 5,903,713 A | 5/1999 | Daels | |
| 5,920,682 A | 7/1999 | Shu et al. | |
| 5,946,450 A * | 8/1999 | Ebner et al. | 358/1.9 |
| 6,078,697 A * | 6/2000 | Ng | 382/275 |
| 6,137,518 A | 10/2000 | Maeda | |
| 6,346,993 B1 * | 2/2002 | Curry | 358/1.9 |

* cited by examiner

HALFTONE METHOD AND APPARATUS THAT PROVIDES A LINE SCREEN FREQUENCY OF N/2 FOR A PRINTER RESOLUTION OF N DOTS PER INCH WITHOUT NEGATIVE PRINT EFFECTS

CROSS-REFERENCE TO RELATED APPLICATIONS

This application is related to the following co-pending and commonly-assigned patent application, which is hereby incorporated herein by reference in its respective entirety:

"HALFTONE METHOD AND APPARATUS THAT PROVIDES SIMULTANEOUS, MULTIPLE LINES PER INCH SCREENS" to Joan L. Mitchell et al., having.

BACKGROUND OF THE INVENTION

1. Field of the Invention

This invention relates in general to halftone image processing, and more particularly to a halftone method and apparatus that provides a line screen frequency of N/2 for a printer resolution of N without negative print effects.

2. Description of Related Art

As an approximation to continuous-tone images, pictorial imagery is represented via a halftone image processing apparatus and process in which each input pel is translated into a j×k pattern of recorded elements, where j and k are positive integers.

Herein, it will be understood that separate threshold matrices are used for each color component. However, as will become obvious from the discussion that follows, the color components will not be considered together. Rather, the term "pel" will be used to refer to "samples" in an array. A halftone image is reproduced by printing the respective pels or leaving them blank. That is, by suitably distributing the recorded elements.

Image processing apparatus and processes are evaluated in part, by their capability of delivering a complete gray scale at normal viewing distances. The capability of a particular process to reproduce high frequency renditions (fine detail) with high contrast modulation makes that procedure superior to one that reproduces such fine detail with lesser or no output contrast.

More recently, supercells have been developed by grouping multiple basic cells together. The supercell approach attempts to improve both gradation and resolution. This method is generally referred to as the "Improved Halftone" (IH) method. In the discussion that follows, the terms "dpi" (dots per inch) and "lpi" (lines per inch) are used throughout. Those skilled in the art will recognize that "dpi" refers to the printer resolution, which is the number of pels per linear inch. The dpi of a printer is linked to the size of each pel, wherein more dots per inch, the finer the resolution. Moreover, those skilled in the art will recognize that "lpi" refers to the halftone line screen resolution, which relates to the amount of lines a printer is able to print in one inch. The line screen frequency is typically defined as X lines/inch, where X=1/d and d is the shortest distance (in inches) between the closest imaginary lines drawn through the dot centers.

As an example of a super cell in the IH method, an 8×8 superthreshold value matrix may be divided into four 4×4 submatrices. The small matrix is adopted for the resolution unit, and the large matrix is adopted for the gradation unit. Thus, the amount of detail is determined by the basic cell size while the number of shades depends upon the supercell size. As the supercells have become larger, more than one pel inside the supercell is turned on for the next input level. However, never more than one pel is turned on at a time inside a basic cell for the next constant input level. The patterns generated by repetition of the original basic cell are contained in the patterns generated by the supercell.

Some newer printers are capable of printing additional levels between off and full on. For example, a high resolution printer may be able to print fourteen additional levels between off and full on. However, such a printer is not a true continuous-tone printer because large areas of solid intermediate values are badly mottled and unpleasant looking. Intermediate values may be printed as isolated spots or more reliably on the edges between white and full-on pels.

One way this is achieved is by clamping the output to zero for input values (V) less than the matrix threshold value (T) for that pels position (modulo the width and height of the threshold matrix) minus Delta1 (D1), i.e., Output=0 if V<(T−D1). The output is forced to the maximum intensity for input values more than the matrix threshold value plus Delta2 (D2), i.e., Output=15 if V>(T+D2). For values between the threshold minus D1 and plus D2, a lookup table (LUT) allows arbitrary assignment of the intensity within the four-bit per color capability of the printer. These intermediate values usually occur near either white or fully saturated pels. Separate Lookup Tables (LUTs) are accessed for the even and odd pel positions due to the parallelism in the hardware. For threshold matrices with an even width, independent LUTs are used for the even and odd columns of the threshold matrix. Still, conventional wisdom asserts that 300 lines per inch (lpi) screens are not possible. Furthermore, conventional wisdom also asserts that 300 lpi screens are bad for the printer and add to its wear.

It can be seen that there is a need for a halftone method and apparatus that provides a line screen frequency of N/2 for a printer resolution of N without negative print effects.

SUMMARY OF THE INVENTION

To overcome the limitations in the prior art described above, and to overcome other limitations that will become apparent upon reading and understanding the present specification, the present invention discloses a halftone method and apparatus that provides a line screen frequency of N/2 for a printer resolution of N without negative print effects.

The present invention solves the above-described problems by creating a 300 lines per inch (lpi) halftoning screen that provides alternating white and saturated colored lines when half of a given color component's pets are on. Empirical rules are used to create the screens based on how that printer creates consistent and reliable levels for each color component.

A halftone line screen in accordance with the principles of the present invention is provided such that a line screen frequency of N/2 lines per inch wherein the printer resolution is N dots per inch.

Other embodiments of a halftone line screen in accordance with the principles of the invention may include alternative or optional additional aspects. One such aspect of the present invention is that N is 600.

Another aspect of the present invention is that the halftone line screen further includes a color component matrix for each of cyan, magenta, yellow and black, and wherein the color component matrix for each of cyan, magenta, yellow and black share a common axis.

Another aspect of the present invention is that lines are printed in the direction of a drum rotation.

Another aspect of the present invention is that intermediate pel values are printed at a leading edge of full-on pels.

Another aspect of the present invention is that a 2×1 vertical area is printed as quickly as possible instead of printing isolated 1×1 pels through many input levels.

Another aspect of the present invention is that not all of the printer's intermediate levels are used for printing. The intensity level must meet a pre-determined intensity level before it is used for printing. For 1×1 and 2×1 vertical areas this pre-determined intensity level is higher than for 1×1 connections between printed vertical lines.

Another aspect of the present invention is that printed intensity levels from the intensity threshold level to full-on provide a linear intensity range.

Another aspect of the present invention is that a single pel is used to bridge a gap of a second line between saturated first and third vertical lines.

Another aspect of the present invention is that a next pel in the second line is an adjacent leading edge pel.

Another aspect of the present invention is that every other line is saturated for areas in which half the pels are turned on.

Another aspect of the present invention is that a relationship between pels in a column and all threshold values in the adjacent columns in the cell are separated.

Another aspect of the present invention is that the separation provides increased threshold values in the basic cell to create leading edge intermediate levels and wrapping around a column at the supercell level when a column is pushed in the matrix.

Another aspect of the present invention is that N×1 rectangles are used to provide an appearance of high resolution, N being the number of pels along the print direction, while printing more consistently than 1×1 dots even when at an intermediate value.

Another aspect of the present invention is that a basic cell comprises 4 pels in a vertical column and 2 pels wide, and wherein the first two pels are turned on together, a next pel in a column leads the pair and a final pel in the column completes the line.

Another aspect of the present invention is that the final two pels are turned on together because the intensity appears to be almost saturated to the human eye already.

Another aspect of the present invention is that separate lookup tables are used for the even and odd columns.

Another aspect of the present invention is that reliable printing is shifted two levels lower when the adjacent columns are printed at the saturated intensity. Another aspect of the present invention is that all of the threshold matrix values in one column are greater or less than all of the threshold matrix values in an adjacent column.

Another aspect of the present invention is that for the light columns the first level in the cell is turned on and a delay of one more level is used before turning on an adjacent neighbor in a 2×1 cell.

Another aspect of the present invention is that the range in dark columns is compressed to prevent printing too dark too soon.

Another aspect of the present invention is that the halftone line screen further includes a color component matrix for each of cyan, magenta, yellow and black, and wherein the color component matrix for yellow comprises a basic cell that is 2 pels wide and 4 pels high to generate patterns at 90 degrees when the first pels are filled in.

Another aspect of the present invention is that the halftone line screen further includes a color component matrix for each of cyan, magenta, yellow and black, and wherein the color component matrix for black comprises a basic cell that is 2 pels wide and 4 pels high, wherein the pels are shifted down 2 pels for every 2 pels to the right to make the color component matrix for black create 45 degree angle patterns when the first 2 pels are filled in.

Another aspect of the present invention is that the halftone line screen further includes a color component matrix for each of cyan, magenta, yellow and black, and wherein the color component matrix for magenta and cyan comprise a basic cell that is 2 pels wide and 4 pels high, wherein columns of pels are shifted an additional pel vertically every three pels to the right and rows of pels are shifted an additional pel horizontally for every three pels down to create patterns at angles of approximately plus/minus 15 degrees.

Another aspect of the present invention is that the approximate 15 degree angle minimizes moiré patterns in light regions, and wherein the shift can be tuned to adjust the angle.

Another aspect of the present invention is that input values of zero print nothing by designing lookup tables for columns with the smaller threshold values to guarantee that inputs of zero are forced to zero for all threshold values in the columns with the smaller threshold values.

Another aspect of the present invention is that the lookup tables are designed so that the minimum threshold value plus the largest negative index for a non-zero output equals one and all output values below this index set to zero.

Another aspect of the present invention is that input values of 255 print saturated colors by designing the lookup tables for columns with the larger threshold values such that 255 is forced to the saturated color for every threshold value in those columns.

Another aspect of the present invention is that the lookup tables are designed so that the maximum threshold value plus the positive index for largest positive lookup table value with output less than maximum equals 254 and all output values above the positive range are set to saturated output.

Another aspect of the present invention is that high contrast graphics (i.e., only 0 and 255) pass through the line screen without being halftoned.

Another aspect of the present invention is that a first pair in a basic cell is arranged to straddle half resolution input pels which have been scaled up to the printer resolution to print more detail by capturing information about both pels of the pair instead of only one pel and after designing threshold matrices for yellow and black the threshold matrices are shifted up one pel and the top row moved below the bottom row.

Another aspect of the present invention is that the color component matrices comprise levels in threshold matrices, a first predetermined number of levels in the threshold matrices being dispersed so the probability of noticeable moiré is reduced.

Another aspect of the present invention is that the color component matrices comprise first values being placed in different quadrants of each of the color component matrices and the second values in each of the color component values taking a different diagonal direction.

Another aspect of the present invention is that light and dark columns are on opposite sides of basic cells for the color component matrices for yellow and black.

Another aspect of the present invention is that light columns for the color component matrices of black and cyan are placed on opposite sides of the color component matrices for the basic cell so the black and yellow basic cells and the cyan and magenta basic cells have the light columns on the same side.

Another aspect of the present invention is that a wrap-around is performed at the supercell level rather than the basic cell level and a lowest threshold value in a dark column does not have to be at a base of the basic cell Another aspect of the present invention is that 256 intensity levels are achieved without using 256 different threshold values.

Other embodiments of the present invention includes a printer system, a method and an article of manufacture that incorporate the aspects of the invention as summarized above.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a halftone method and apparatus that provides a line screen frequency of N/2 for a printer resolution of N without negative print effects. A 300 lines per inch halftone screen for a 600 dpi printer may thus be created by alternating white and saturated colored lines when half of a given color component's pels are on. Empirical rules are used to create the screens based on how that printer creates consistent and reliable levels for each color component. These rules allow intermediate intensity values between white and full-on at each pel. Since the halftoning is done in the hardware just before printing, the print direction relative to the threshold matrix is known. No rotation capability is needed because if an image needs to be rotated, it is done previously to being sent to the hardware. Furthermore, because a pair of pels are turned on for the lightest values (or possibly with a one level difference between the first and second dots in the pair), the electronics are stressed less. Moreover, the drive will be at a lower frequency than the first dot in the traditional halftone cell, which remains isolated for many levels. In terms of drum wear, the vibration in the printer is at least one pel wide so that vertical lines are not charging exactly the same area after a drum rotation. If the lines were many pels thick, then uneven use might be a problem. If an image with fully saturated colors were printed repeatedly over the same area (which can happen if the drum diameter happens to be an integer number of pages), every halftoning technique would print the fully saturated colors repeated over the same area on the drum and have the same problems. When the image has lighter colors (half or less of each given color are on), the present invention has a higher probability that the drum will see on the average a quarter or less due to the mechanics of the drum giving at least a one pel variation after a drum revolution.

Figure 1:
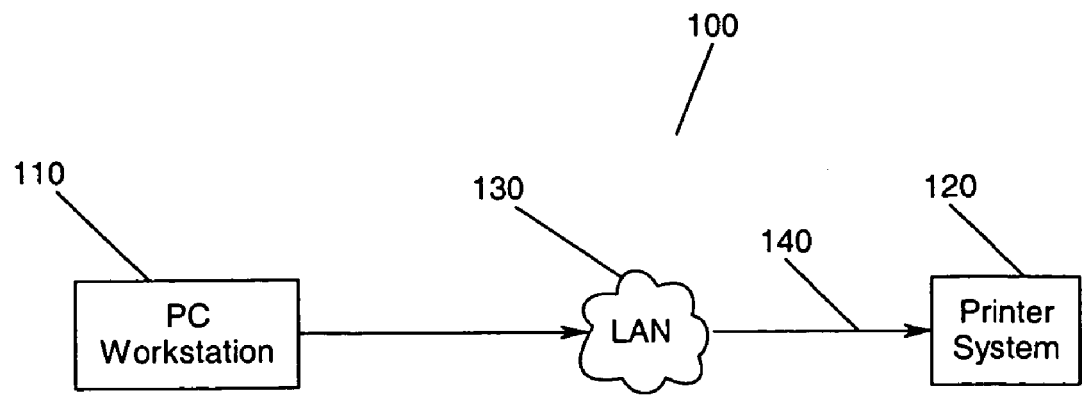
FIG. 1 illustrates a simplified block diagram of a printing environment according to the present invention.

FIG. 1 illustrates a simplified block diagram of a printing environment 100 according to the present invention. In FIG. 1, a personal computer workstation 110 is coupled to a printer system 120 via a local area network (LAN) 130. The personal computer workstation 110 sends print data to the printer system 120 when the personal computer workstation 110 has data to print. The printer system 120 converts the input print data stream 140 to a data stream supported by the printer system 120. For example, the printer system 120 may accept the Intelligent Printer Data Stream (IPDS), PostScript, or some other printer data stream. The printer system 120 may also be configured to perform manipulation of compressed images, such as rotation, to allow more efficient processing of the input print data stream 140.

Figure 2:
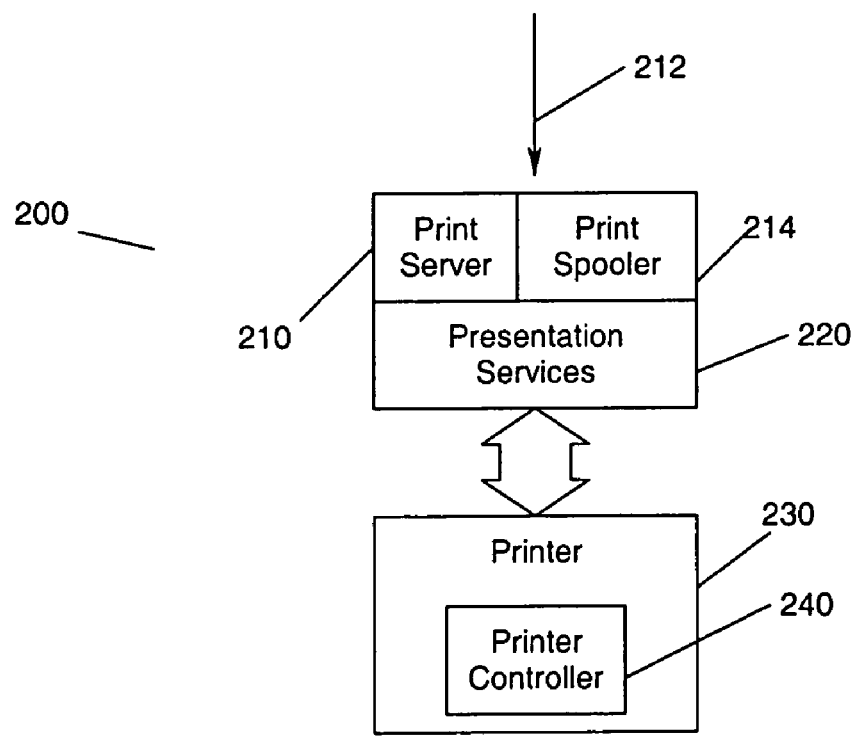
FIG. 2 illustrates a more detailed block diagram of one embodiment of a printer system according to the present invention.

FIG. 2 illustrates a more detailed block diagram of one embodiment of a printer system 200 according to the present invention. In FIG. 2, the printer system 200 includes a print server 210 for receiving the input print data stream 212, a print spooler 214 for controlling the spooling of data files and presentation services 220 for generating appropriate commands to drive an attached printer 230. The print server 210 may also include other components that are not shown for performing basic tasks, such as monitoring and configuring attached printers, and providing print job management. The printer server 210 converts the input print data steam 212 to a data steam supported by the printer 230. The print server 210 may be configured to provide image processing such as halftoning according to the present invention. Alternatively, the image processing may be performed local to the printer 230, e.g., by the printer controller 240.

Figure 3:
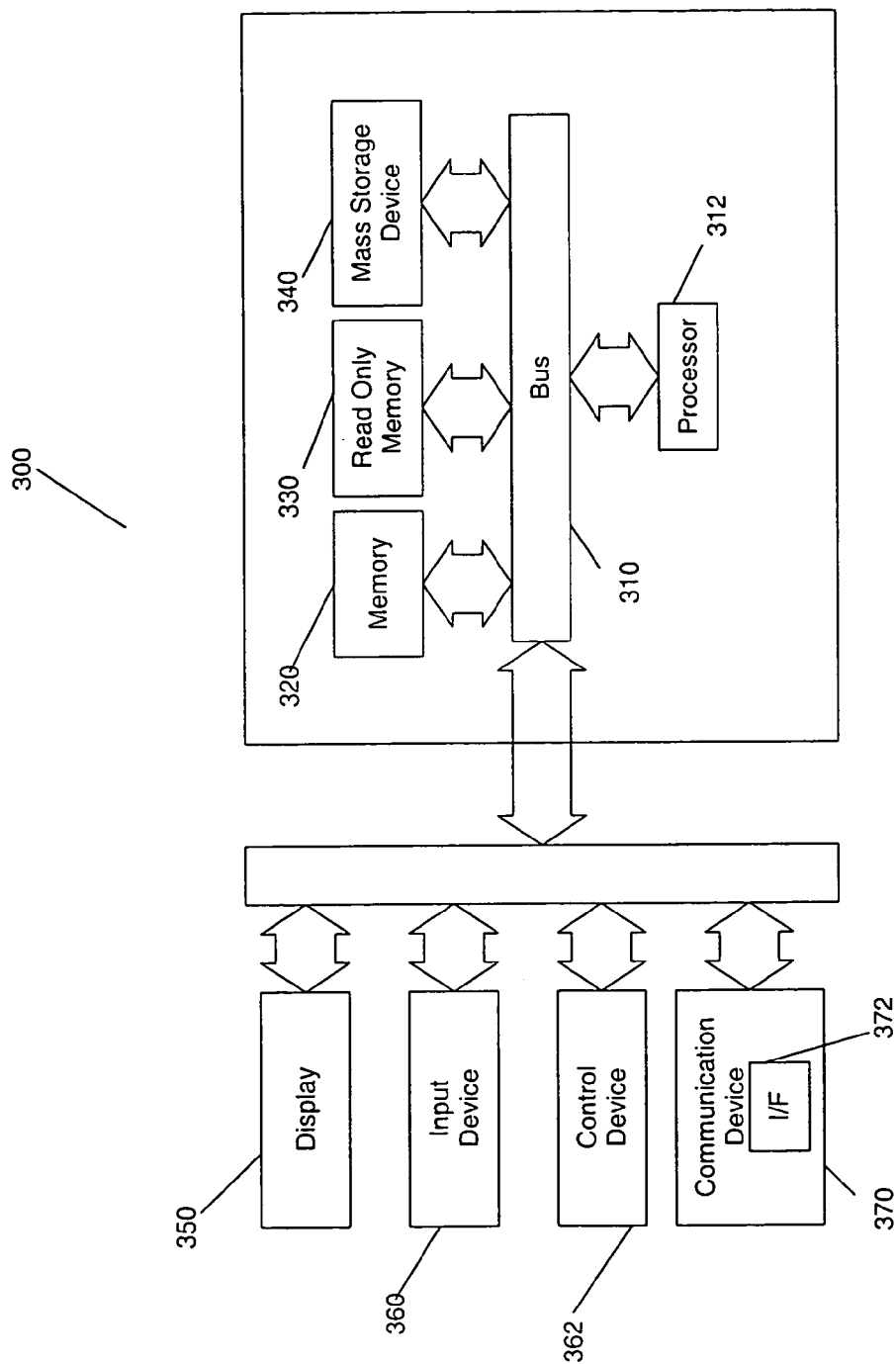
FIG. 3 illustrates one embodiment of device in the form of a computer system in which features of the present invention may be implemented.

Having briefly described one example of a printing environment in which the present invention may be employed, one embodiment of device in the form of a computer system 300 in which features of the present invention may be implemented will now be described with reference to FIG. 3. As shown in FIG. 3, the computer system 300 may represent a workstation, host, server, print server, printer or printer controller. Computer system 300 includes a bus or other communication means 310 for communicating information and a processing means such as a processor 312 coupled with bus 310 for processing information. Computer system 300 also includes a random access memory (RAM) or other dynamic storage device 320, coupled to bus 310 for storing information and instructions to be executed by processor 312. Memory 320 also may be used for storing temporary variables or other intermediate information during execution of instructions by processor 312. Computer system 300 may also include a read only memory (ROM) and/or other static storage device 330 coupled to the bus 310 for storing static information and instructions for processor 312.

A data storage device 340 such as a magnetic disk or optical disk and its corresponding drive may also be coupled to the bus 310 for storing information and instructions. Computer system 300 can also be coupled via bus 310 to a display device 350, such as a cathode ray tube (CRT) or Liquid Crystal Display (LCD), for displaying information to an end user. Typically, an input device 360 is coupled to bus 310 for communicating information and/or command selections to processor 312. Another type of user input device 362 communicates direction information and command selections to processor 312 and for controlling cursor movement on display 350.

A communication device 370 is also coupled to bus 310. Depending upon the particular presentation environment implementation, the communication device 370 may include a modem, network interface card or other well know interface devices 372, such as those used for coupling to Ethernet, token ring, or other types of physical attachment for purposed of providing communication link to support a local or wide area network, for example. In this manner, the computer system 300 may be coupled to a number of clients and/or servers via a conventional network infrastructure.

The present invention is related to the use of computer system 300 to direct the execution of one or more software and/or firmware routines to manipulate print images as discussed herein. As computer system 300 executes the one or more routines, the processor 312 may access image data stored within memory 320, ROM 330, or another storage device to manipulate an image according to the halftone process described herein. Importantly, the present invention is not limited to having all of the routines located on the same computer system. Rather, individual objects, program elements, or portions thereof may be spread over a distributed network of computer systems. Additionally, those skilled in the art will recognize that a lesser or more equipped computer system than the example described above may be desirable for certain implementations. Therefore, the configuration of computer system 300 will vary from implementation to implementation depending upon numerous factors, such as price constraints, performance requirements, and/or other circumstances. For example, according to one embodiment of the present invention, an embedded printer controller may comprise only a processor and a memory for storing static or dynamically loaded instructions and/or data.

Figure 4:
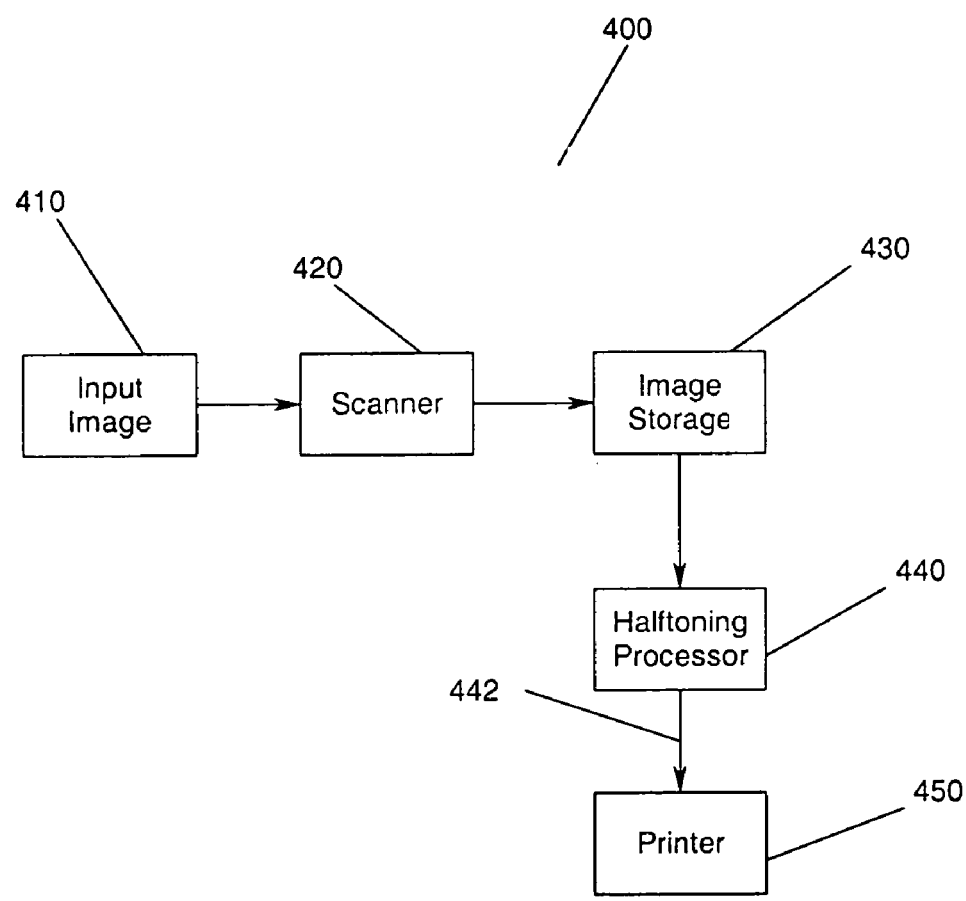
FIG. 4 illustrates a block diagram of a halftoning system according to the present invention.

FIG. 4 illustrates a block diagram of a halftoning system 400 according to the present invention. In FIG. 4, an input image 410 is scanned by a scanner 420 and stored in image storage 430. A halftoning process 440 processes the stored image to using a halftoning threshold matrix to determine whether a pel at a location (u, v) will get printed as a dot at a chosen intensity level. The output 442 of the halftoning processor 440 is sent to a multitone printer 450. The halftoning process according to the present invention will now be explained herein below with reference to FIGS. 5-15.

The present invention is directed to a halftone a line screen having a line screen frequency of N/2 lines per inch wherein the printer resolution is N dots per inch. Thus, a 300 lines per inch halftone screen for a 600 dpi printer may be created by alternating white and saturated colored lines when half of a given color component's pels are on. As will be described herein, empirical rules are used to create the screens based on how a printer creates consistent and reliable levels for each color component. These rules allow intermediate intensity values between white and full-on at each pel. Printer electronics are stressed less because a pair of pels are turned on for the lightest values (or possibly with a one level difference between the first and second dots in the pair). Moreover, the drive is at a lower frequency than the first dot in the traditional halftone cell, which remains isolated for many levels.

Figure 5B:
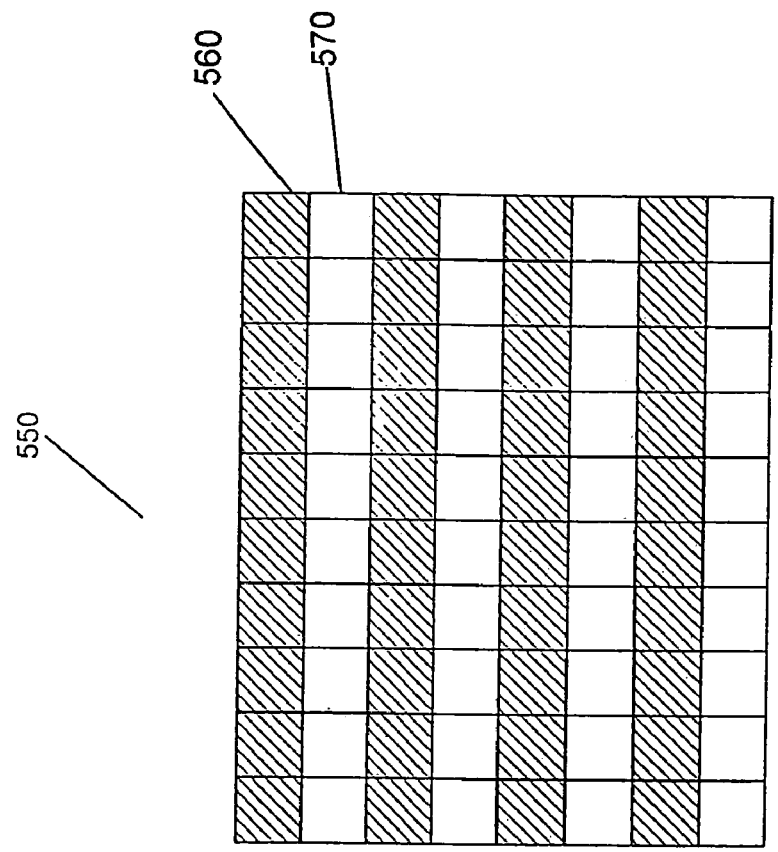
FIG. 5b illustrates another embodiment of the line screen having a line screen frequency that is half of the printer resolution in the horizontal direction.
Figure 5A:
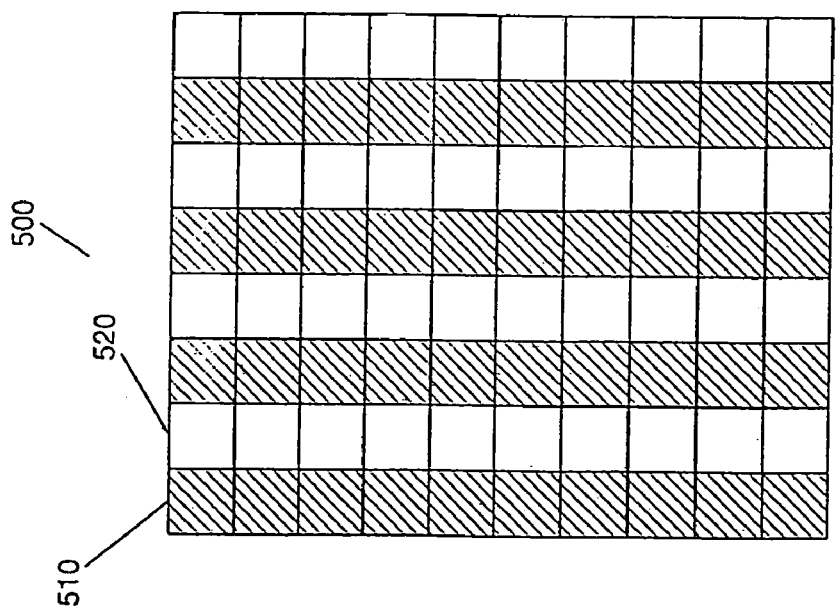
FIG. 5a illustrates a halftone line screen having a line screen frequency of N/2 lines per inch wherein the printer resolution is N dots per inch.

FIG. 5a illustrates a halftone a line screen 500 having a line screen frequency of N/2 lines per inch wherein the printer resolution is N dots per inch. FIG. 5a illustrates vertical lines along the paper path. Printing all four color components with screens that create vertical lines along the paper path direction seems to give more consistent results than mixing horizontal and vertical lines. Vertical lines of full on 510 and off 520 are shown in FIG. 5a. At 300 lpi the eye perceives continuous color rather than seeing the lines. Moreover, the 300 lpi line screen does not produce moiré patterns due to interference between the different color components. FIG. 5b illustrates another embodiment of a halftone line screen 550 having a line screen frequency that is half of the printer resolution in the horizontal direction. Here, horizontal lines of full on 560 and off 570 are shown.

Figure 6:
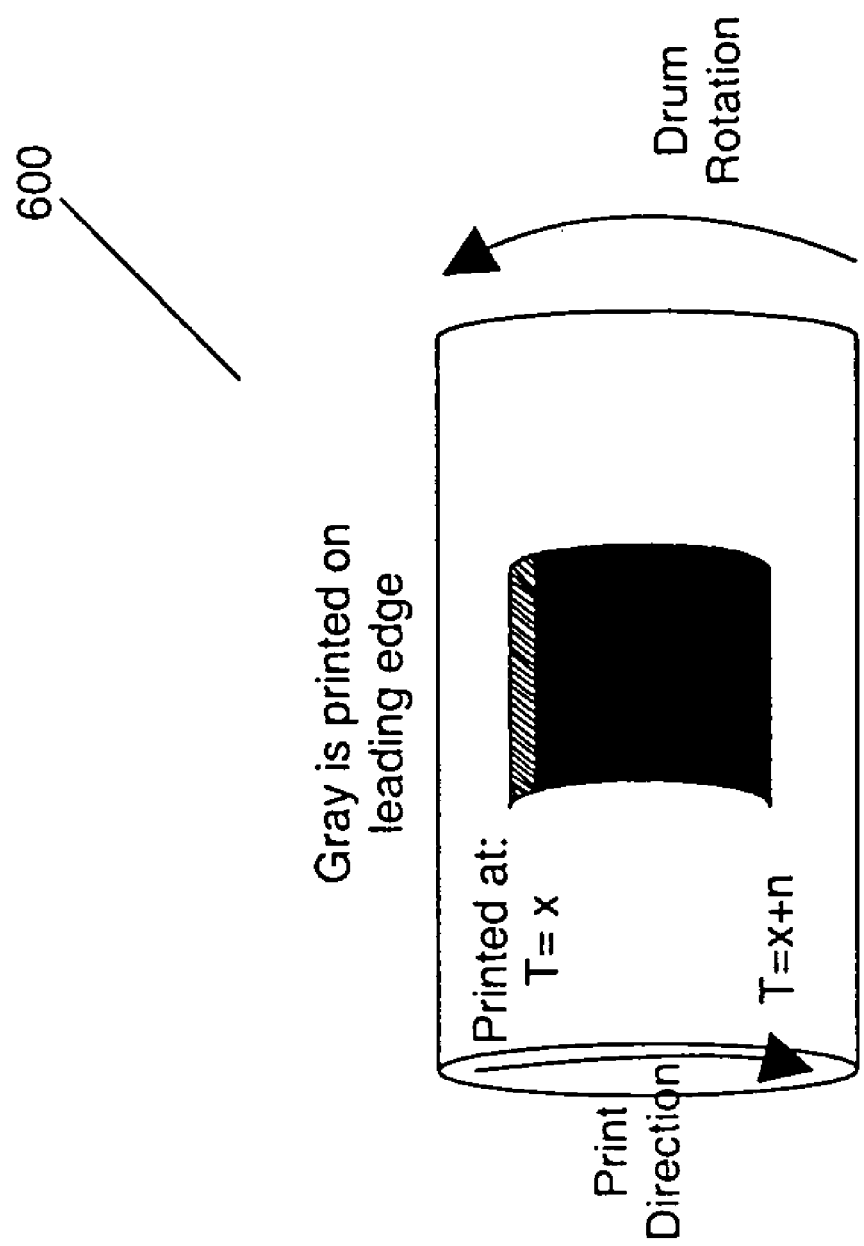
FIG. 6 illustrates the process of an intermediate (gray) value being printed on the leading edge of full on pels (black)

FIG. 6 illustrates the process 600 of an intermediate (gray) value being printed on the leading edge of full on pels (black). The intermediate values are printed at time T=x in the direction of print as illustrated. The drum rotates as shown. It is better to print an intermediate value on the leading edge of full-on pels rather than the trailing edge because printing the intermediate values on the trailing edges causes the intermediate values to smear into the white pels that follow.

To ensure that input values of zero print nothing, the "light" LUT, i.e., the LUT for columns with the smaller threshold values, are designed to guarantee that inputs of zero are forced to zero for all threshold values in the "light" columns. This means that the minimum threshold value plus the largest negative index for a non-zero output equals one. All output values below this index set to zero. Similarly, to ensure that input values of 255 print saturated colors, the "dark" LUT, i.e., the LUT for columns with the larger threshold values, are designed such that 255 is forced to the saturated color for every threshold value in those columns. This means that the maximum threshold value plus the positive index for largest positive LUT value with output less than maximum equals 254. All output values above the positive range are set to saturated output (15 for a 4-bit per color printer). Note that the combination of these rules for "light" and "dark" allows high contrast graphics (i.e. binary halftoning, line art, or graphics) to pass through the line screen without being halftoned.

Figure 7:
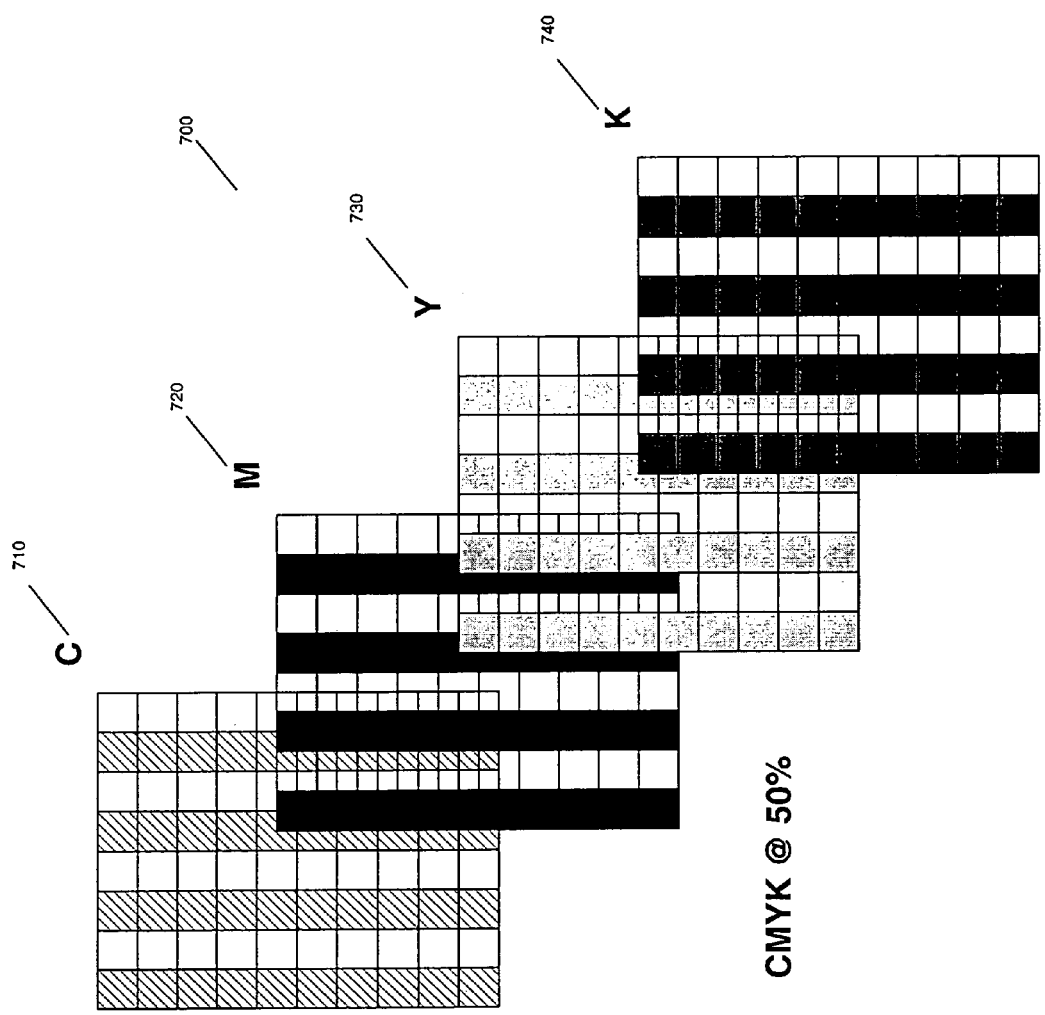
FIG. 7 illustrates line screens for cyan (C), magenta (M), yellow (Y), and black (K) set at 50%.

FIG. 7 illustrates line screens 700 for cyan (C) 710, magenta (M) 720, yellow (Y) 730, and black (K) 740 set at 50%. Note that the horizontal shift in the cyan and magenta matrices are not shown in this illustration. After the shift the first pair in the original 4×2 cyan and magenta basic cells will continue to be a 2×1 vertical pair, sometimes a 1×2 horizontal pair, and occasionally two diagonally touching pels. The halftone line screen include a color component matrix for each of cyan, magenta, yellow and black, wherein the color component matrix for each of cyan, magenta, yellow and black share a common axis. N×1 rectangles, i.e., 1 pel wide, N pels along the print direction, maintain much of the appearance of a higher resolution while printing more consistently than 1×1 dots even when at an intermediate value.

At all intensity levels the 1×1 isolated dots do not print reliably and seem to be particularly sensitive to local paper conditions. 2×1 spots print reliably once the intensity is above the on-set of printing threshold level. Therefore, instead of printing isolated dots for the first 32 or more levels, a 2×1 vertical area is printed as quickly as possible. All intermediate intensity levels are not used.

Figure 8:
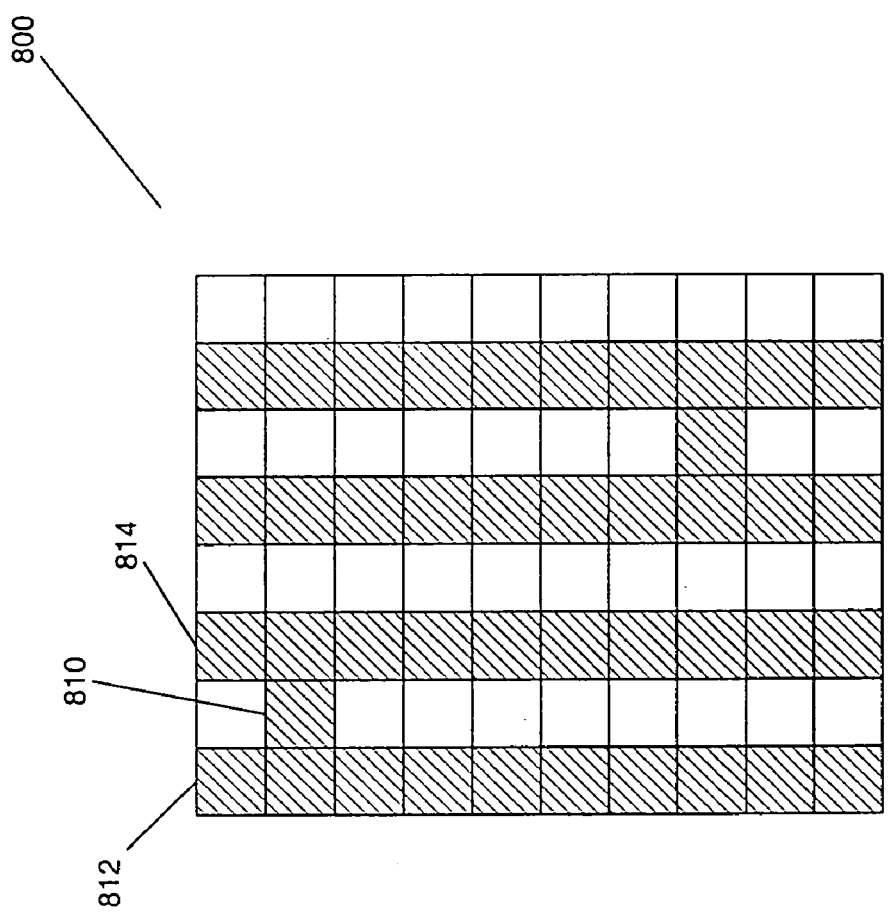
FIG. 8 illustrates how the gap between saturated vertical lines are bridged according to the present invention.
Figure 9:
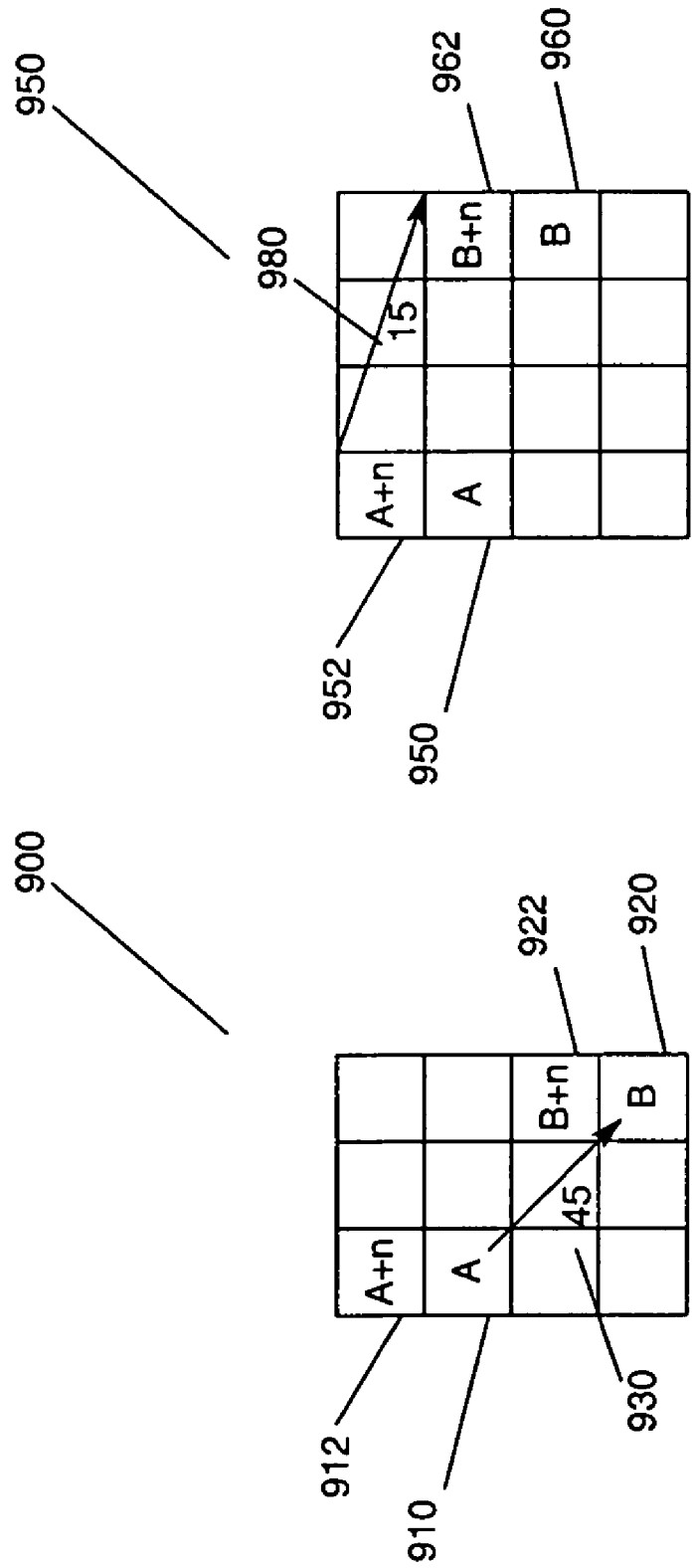
FIG. 9a illustrates the shifting of pels 2 for every 2 pels to the right.
FIG. 9b illustrates the shifting of pels 1 for every 3 pels to the right.

FIG. 8 illustrates how the gap between saturated vertical lines are bridged 800 according to the present invention. As illustrated in FIG. 8, the first pel 810 to bridge the gap between the saturated vertical lines 812, 814 seems to print reliably as a single pel. The next in the second column is then the adjacent leading pel. The final two pels may be turned on together because the intensity appears to be almost saturated to the human eye already.

Figure 14:
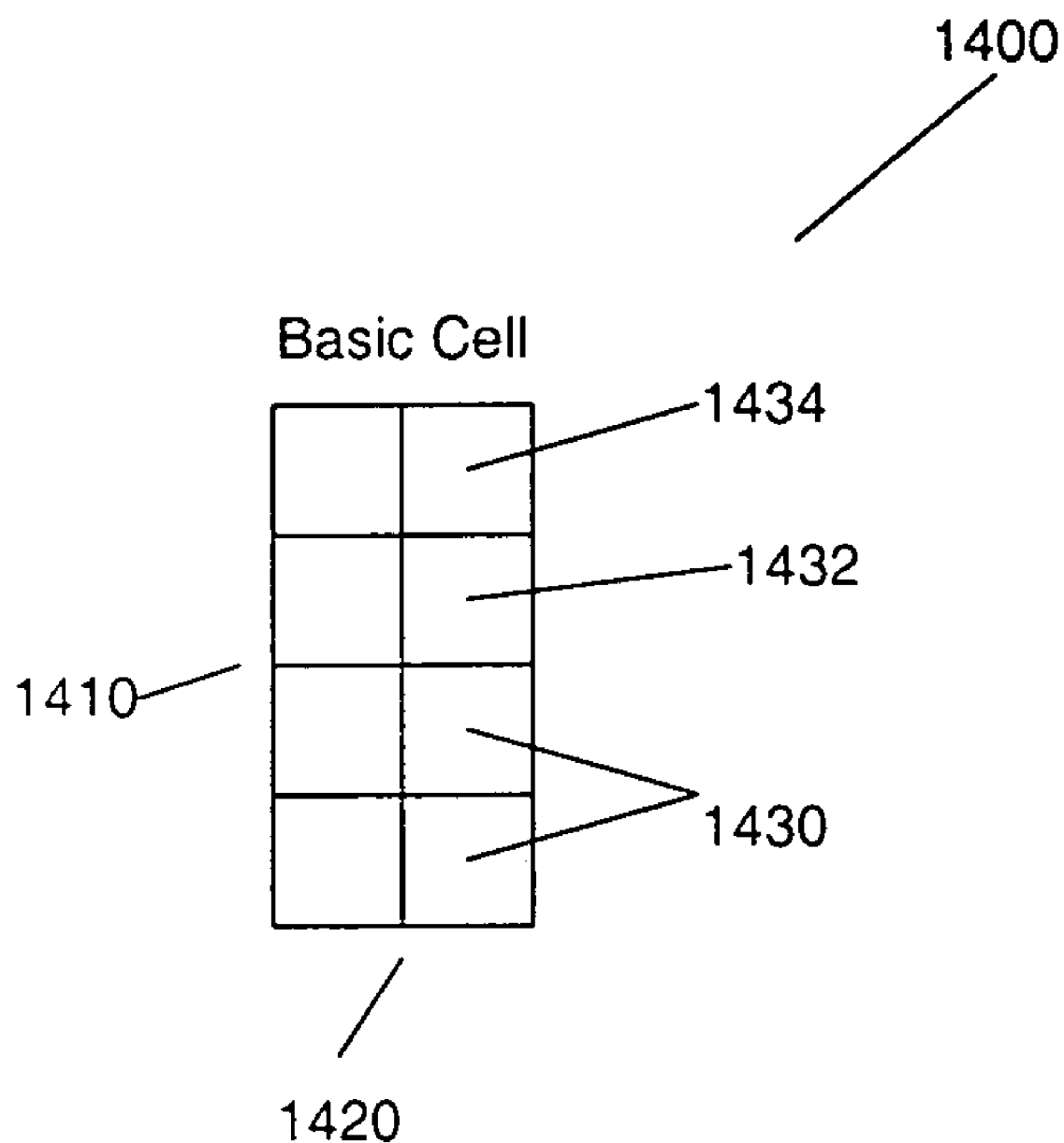
FIG. 14 illustrates the basic cell that is 4 pels high and 2 pels wide.

The yellow matrix 730 of FIG. 7 is made up of 2 wide by 4 high basic cells 1400, as illustrated in FIG. 14, that generate patterns at 90 degrees when the first pels are filled in. These patterns are not detectable to the human eye even when mixed with cyan to create green shades. The black matrix 740 of FIG. 7 is also made up of 2 wide by 4 high basic cells 1400, as illustrated in FIG. 14 that are shifted 2 pels (down in this example) for every 2 pels to the right 900 as illustrated in FIG. 9a, i.e., B 920 is shifted relative to A 910 and B+n 922 is shifted relative to A+n 912. This makes the basic black matrix create 45 degree angle patterns 930 when the first 2 pels are filled in, A 910 and B 920.

The cyan/magenta matrices 710, 720 are also made up of the 2 wide by 4 high basic cells 1400 as illustrated in FIG. 14. However, columns of pels are shifted an additional pel vertically every three pels to the right and rows of pels are shifted an additional pel horizontally for every three pels down, i.e., B 960 is shifted relative to A 950 and B+n 962 is shifted relative to A+n 952 to create patterns at an angle of approximately 15 degrees 980 as illustrated in FIG. 9b. FIG. 9b illustrates the first vertical shift. 15 degrees is the conventional choice to minimize moiré patterns in light regions. The angle may be tuned by having an occasion shift up/down or left/right every two or four pels if desired within the supercell. A shift exactly every three pels to the right, however, is not necessary. Further, the final size of the supercell must be a integer multiple of the shifting cycle.

Because the cyan and magenta screens are shifted every three pels to the right, the initial pair (printed at 600 dpi) will cycle through all phases relative to the 300 dpi images. However, the yellow and black screens will keep their initial phase relative to the 300 dpi images since the yellow does not shift and the black shifts by 2. By having the first pair in the basic cell split between lower resolution pels (e.g., 300 dpi pels as input for a 600 dpi printer), more print detail is available because more information may be captured about both pels instead of only one pel.

The matrices for the different color components are designed so that the first few levels in the threshold matrices for the various colors are as dispersed as possible so the probability of noticeable moiré is reduced. This also helps pick up detail early even if only one color component is present per pel.

Figure 10:
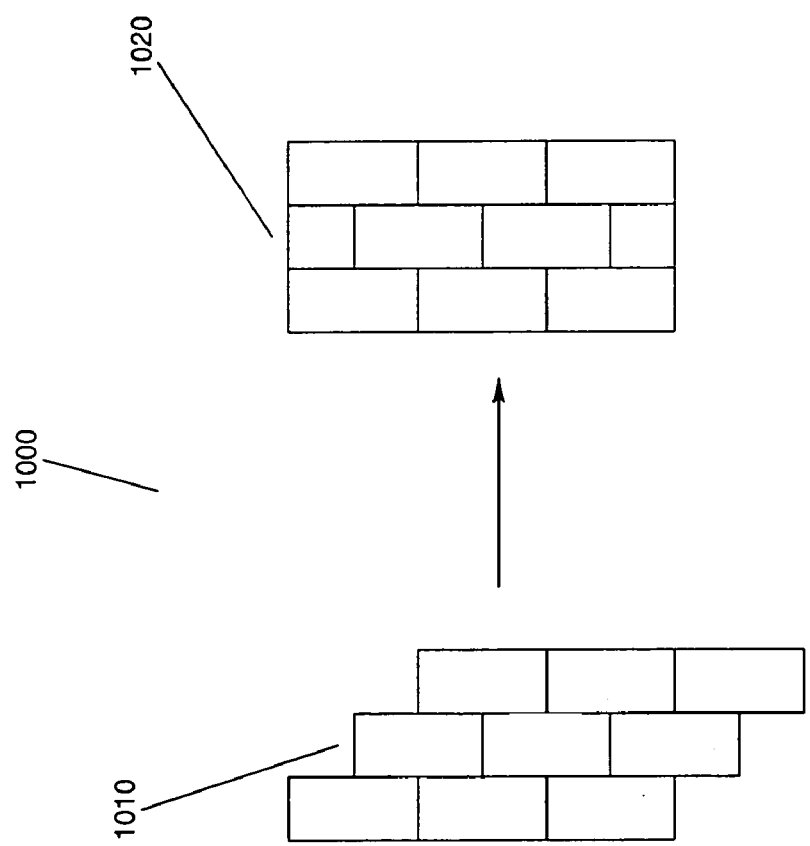
FIG. 10 illustrates the supercell wrap-around according to the present invention'

The first pair is arranged to straddle half resolution input pels which have been scaled up to the printer resolution to print more detail by capturing information about both pels of the pair instead of only one pel. Thus, after designing threshold matrices for yellow and black, the threshold matrices are shifted up one pel and the top row moved below the bottom row of the supercell. Traditionally, the basic cell is a unit and all threshold values in it have a fixed relationship to each other until noise is added. However, according to the present invention, the larger threshold values in the basic cell create leading edge intermediate levels and a wrap-around occurs at the supercell level rather than the basic cell level when a column is pushed upward or downward or if the initial pair is pushed upward or downward 1010 in the matrix as illustrated in FIG. 10.

Since the wraparound is being done at the supercell level 1000 rather than the basic cell level, the lowest threshold value in the dark column does not have to be at the base of the basic cell. In fact, the dark column can be filled in completely independently of the light column. The two-wide by four-high basic cell may be converted to two 1×4 cells with a relative displacement 1020.

Figure 11:
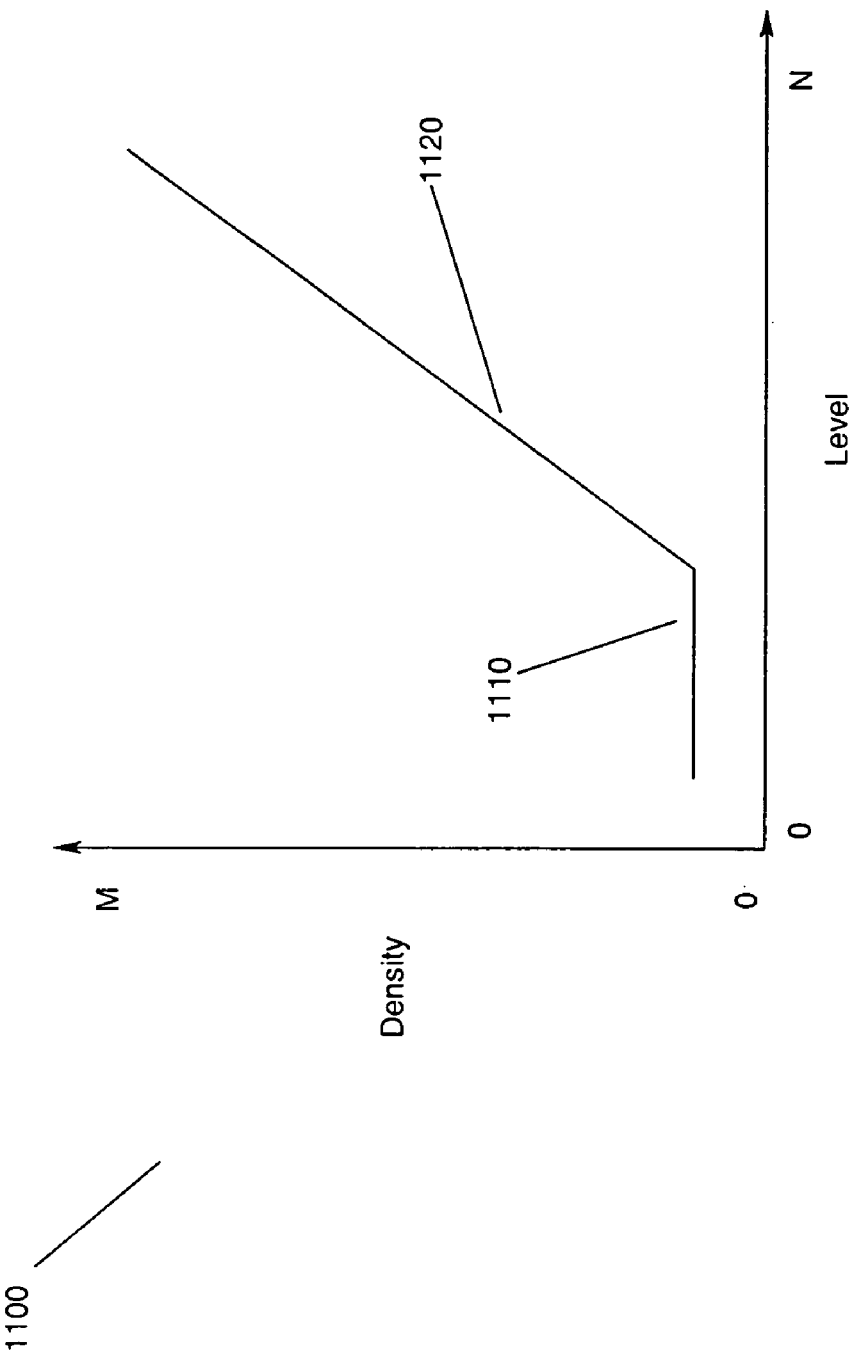
FIG. 11 illustrates the intensity threshold effect.

FIG. 11 illustrates the intensity threshold effect 1100. There is an intensity threshold level 1110 that is a function of the toner color below which the intensity levels do not print reliably and are extra sensitive to local paper conditions. Through density measurements, this intensity threshold was discovered to extend beyond isolated dots so that it applied to intermediate values printed between white and full-on pels. From this threshold to the full-on intensity the density change as a function of level is approximately linear 1120. Those skilled in the art will recognize that the straight line 1120 is presented only as an approximation for a progression of steps. The LUTs may then be designed to force the intensity below the threshold to zero so that we are using only the reliable (approximately linear) useful range.

Figure 12:
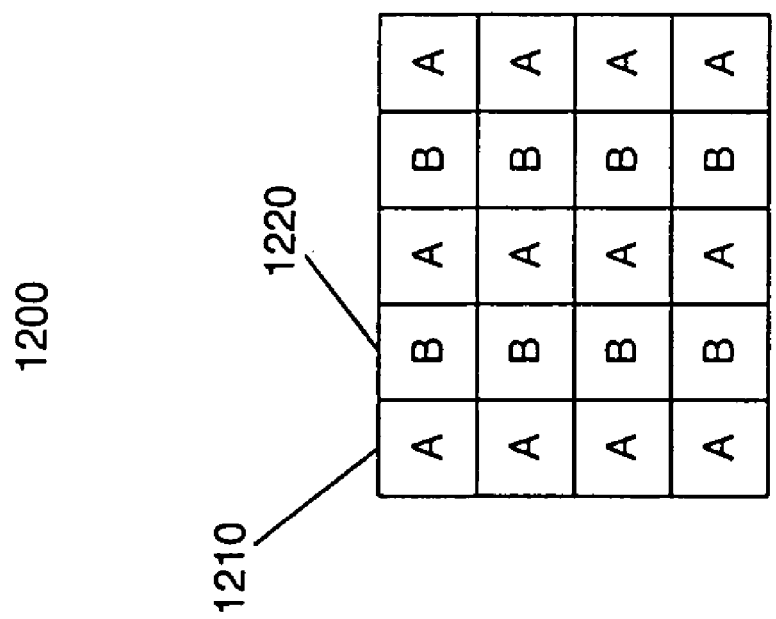
FIG. 12 illustrates LUTs assigned to columns in a matrix.

FIG. 12 illustrates LUTs assigned to columns in a matrix 1200. The onset of the reliable printing for some printers appears to be shifted about two levels (out of 15 levels) lower when the adjacent columns are printed at the saturated intensity. By taking advantage of the hardware parallelism which uses separate LUTs for the odd 1210 and even 1220 columns, as illustrated in FIG. 12, the shift in the onset of printing can be used because all of the threshold matrix values in one column are either more or less than all of the threshold matrix values in its adjacent columns. The wedge devoted to the darker regions must be compressed however. Before calibration the wedge consistently prints too dark too soon. As a refinement, the LUTs may be used to compress the range in the dark columns so as to have less steps.

Figure 13:
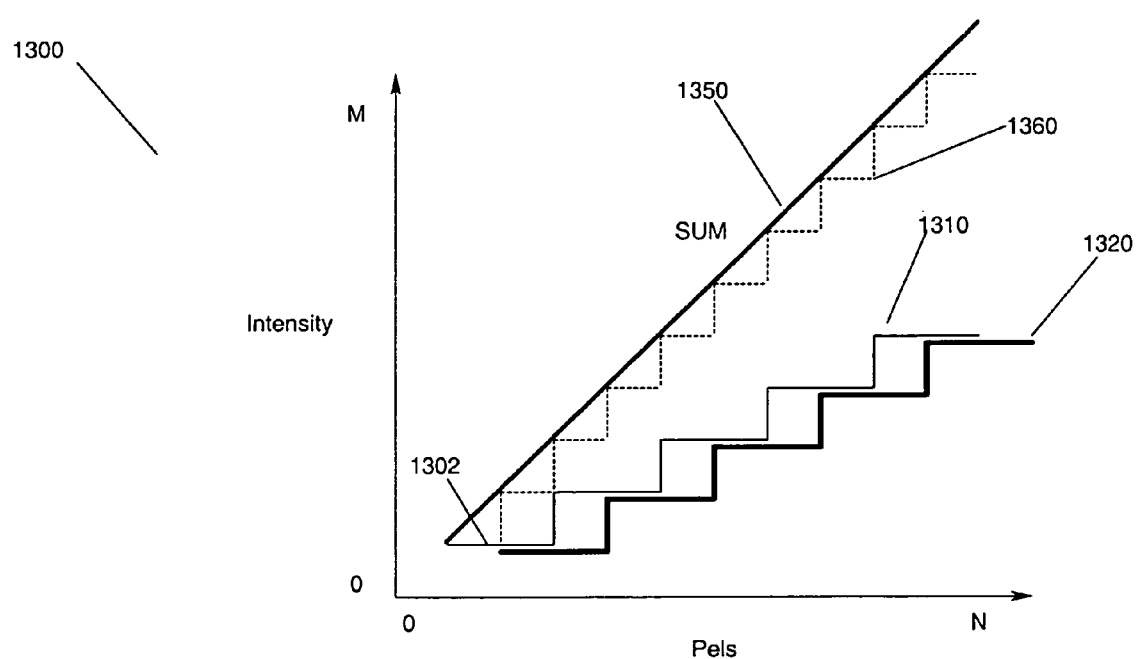
FIG. 13 illustrates shifting of pel levels to produce a smooth ramp.

FIG. 13 illustrates shifting of pel levels to produce a smooth ramp 1300. The first level 1302 in a cell may be turned on and a predetermined delay may be used before turning on its adjacent neighbor in the 2×1 rectangle. A step-ramp 1310, 1320 is thus plotted for the two pets in FIG. 13. If the useful range is stretched by a factor a two, then both pets will contribute to create a smooth ramp 1350 with twice the useful range. Again the smooth ramp 1350 is only an approximation. The actual contribution by both pets is represented by the stepped-ramp 1360.

FIG. 14 illustrates the basic cell 1400 that is 4 pels high 1410 and 2 pels wide 1420. The first two pels are turned on together 1430, the next pel 1432 in that column should lead the pair and prints reliable as a single intermediate level pel. The final pel 1434 in that column completes the line.

In addition to the above described rules, the smallest size screens are designed to be consistent with a full 256 levels and some flexibility is provided for changes due to calibrating the levels. Taking advantage of the intermediate levels means that unlike binary halftoning screens the 256 levels can be achieved without necessarily containing 256 different threshold values. However, light areas suffer from severe moiré patterns when an identical 6×6 matrix is used for all four components due to slight and unavoidable misregistration of the printer, but the dark areas did not. Accordingly, different strategies are needed for the light columns and the dark columns. The color component matrices have first values placed in different quadrants of each of the color component matrices and the second values in each of the color component values take a different diagonal direction. Further, light columns for the color component matrices of black and cyan are placed on opposite sides of the color component matrices for the basic cell so the black and yellow basic cells and the cyan and magenta basic cells have the light columns on the same side.

This invention has primarily been described in terms of multitone printers with intermediate gray capability. Using larger supercells, the same basic 4×2 basic cells can be implemented to generate halftoning for binary printers too. Those skilled in the art will recognize that intermediate levels are not needed.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for printing using a halftone line screen, comprising:
    providing data for printing to a printing device having a printing resolution of N dots per inch;
    establishing a halftone line screen having a line screen frequency of N/2 lines per inch, wherein the halftone line screen includes M pels and provides M+1 tone levels, wherein the halftone line screen includes a color component matrix, the color component matrix comprising a plurality of cells, each cell comprising an array of pels, wherein each cell comprises A columns and B rows of pels, and wherein the method further comprises alternating saturated lines of pels are formed in the color matrix by saturating only (A/2) 1×B pels or (B/2) 1×A pels in each cell to saturate 50% of the pels in each of the cells for 50% intensity for a cell; and
    applying the halftone line screen to the data to transform the data provided for printing into a visual representation of the data.

2. The method of claim 1 further comprising linearly shifting pels in a first cell of the color component matrix relative to a second cell to create a selected angled pattern.

3. The method of claim 1, wherein the establishing a printer resolution of N dots per inch comprises establishing a printer resolution of 600 dots per inch.

4. The method of claim 1, wherein the alternating vertical lines comprises printing vertical lines in a direction along the paper path.

5. The method of claim 4, wherein the alternating vertical lines prevents production of moiré patterns because of interference between different color components of the color component matrix.

6. The method of claim 1, wherein intermediate pel values are printed at a leading edge of full-on pels.

7. A program storage device readable by a computer, the medium tangibly embodying one or more programs of instructions that are executed by the computer to perform a method for producing a halftone line screen, the method comprising:
    providing data for printing to a printing device having a printing resolution of N dots per inch;
    establishing a halftone line screen having a line screen frequency of N/2 lines per inch and a printer resolution of N dots per inch, wherein the halftone line screen includes M pels and provides M+1 tone levels, wherein the halftone line screen includes a color component matrix, the color component matrix comprising a plurality of cells, each cell comprising an array of pels A columns and B rows of pels, wherein the method further comprises alternating saturated lines of pels are formed in the color matrix by saturating only (A/2) 1×B pels or (B/2) 1×A pels in each cell to saturate 50% of the pels in each of the cells for 50% intensity for a cell; and
    applying the halftone line screen to the data to transform the data provided for printing into a visual representation of the data.

8. The program storage device of claim 7 further comprising linearly shifting pels in a first cell of the color component matrix relative to a second cell to create a selected angled pattern.

9. The program storage device of claim 7, wherein the establishing a printer resolution of N dots per inch comprises establishing a printer resolution of 600 dots per inch.

10. The program storage device of claim 7, wherein the alternating vertical lines comprises printing vertical lines in a direction along the paper path.

11. The program storage device of claim 10, wherein the alternating vertical lines prevents production of moiré patterns because of interference between different color components of the color component matrix.

12. The program storage device of claim 7, wherein intermediate pel values are printed at a leading edge of full-on pels.

* * * * *

UNITED STATES PATENT AND TRADEMARK OFFICE
CERTIFICATE OF CORRECTION

| | | |
|---|---|---|
| PATENT NO. | : 7,835,034 B1 | |
| APPLICATION NO. | : 09/571968 | |
| DATED | : November 16, 2010 | |
| INVENTOR(S) | : Mitchell et al. | |

It is certified that error appears in the above-identified patent and that said Letters Patent is hereby corrected as shown below:

Col. 9, line 18: "The next in the second column" should read --The next pel in the second column--

Signed and Sealed this
Twenty-eighth Day of June, 2011

David J. Kappos
*Director of the United States Patent and Trademark Office*